United States Patent Office 2,899,427
Patented Aug. 11, 1959

2,899,427

PREGNANE DERIVATIVES

Carl Djerassi, Birmingham, Mich., and George Rosenkranz, Mexico City, Mexico, assignors, by mesne assignments, to Syntex S.A., Mexico City, Mexico, a corporation of Mexico No Drawing. Application March 6, 1953
Serial No. 340,900

Claims priority, application Mexico March 12, 1952

14 Claims. (Cl. 260—239.55)

The present invention relates to novel cyclopentanophenanthrene derivatives and to a method for the preparation thereof.

More particularly, the present invention relates to a new method for the preparation of allopregnan-3β,11α,17α,21-tetrol-20-one and esters thereof which has been shown to be an important intermediate for the synthesis of cortisone, in our United States application, Serial No. 307,722, filed September 3, 1952, now Patent No. 2,773,079, granted December 4, 1956. The present application further relates to certain other important intermediates which may be utilized for the production of the novel intermediate allopregnan-11α,17α,21-triol-3,20-dione and/or its esters. As disclosed in our United States application, Serial No. 340,896, now abandoned, filed as of even date herewith, this last compound may be utilized for the production of Δ⁴-pregnene-11α,17α,21-triol-3,20-dione and/or esters thereof which may be readily transformed into the corresponding ester of cortisone.

In our United States patent application, Serial Number 337,431, filed February 17, 1953, now Patent No. 2,773,887, granted December 11, 1956, there is disclosed the production of 16α,17α-oxido-allopregnan-3β,11α-diol-20-one and/or esters thereof.

In accordance with the present invention, it has been discovered that compounds of the last mentioned type may be transformed into corresponding novel compounds and valuable intermediates of the pregnane or allopregnan series having additional free or esterified 21-hydroxy groups, an additional 17α-hydroxy group and/or having a 3-keto group in place of the 3-hydroxy group of the starting material.

The novel process and the novel compounds of the present invention may be exemplified in part by the following equation:

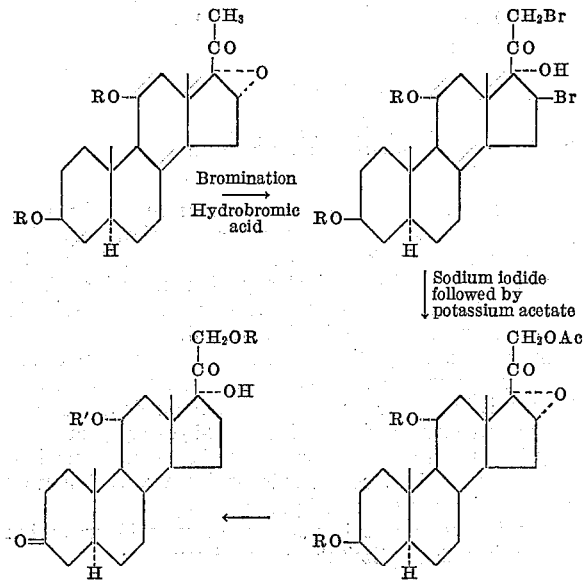

In the above equation, R represents an acyl group, i.e., the residue of any organic acid customarily used for the esterification of steroid alcohols. More particularly, R represents the residue of a lower fatty acid such as acetic or propionic or the residue of an aromatic acid such as benzoic. R', in the above equation, represents the same acyl groups as R and, in addition, may represent hydrogen. Ac represents the acetyl group.

In practicing the process above outlined, a suitable diester of 16α,17α-oxido-allopregnan-3β,11α-diol-20-one, preferably, the diacetate in a suitable solvent such as glacial acetic acid is treated at just below room temperature with hydrobromic acid and approximately 1 molar equivalent of bromine. As indicated, in the equation, this leads to the formation of a 21-bromo derivative with the simultaneous opening of the oxide ring so that there is produced a 17α-hydroxy 16,21-dibromo derivative which is preferably then treated with an alkali metal iodide such as sodium iodide to prepare the corresponding 21-iodo derivative. The 21-iodo derivative is characterized by an increased reactivity and treatment of this compound with potassium acetate produces a 21-acetate 3,11-diester of 16α,17α-oxido-allopregnan-3β,11α,21-triol-20-one. This last compound may be transformed, in accordance with the present invention, into the corresponding 21-monoester or 11,21-diester of allopregnan-11α,17α,21-triol-3,20-dione.

One of the methods for transforming a triester of 16α,17α-oxido-allopregnan-3β,11α,21-triol-20-one into a diester of allopregnan-11α,17α,21-triol-3,20-dione is indicated by the following equation:

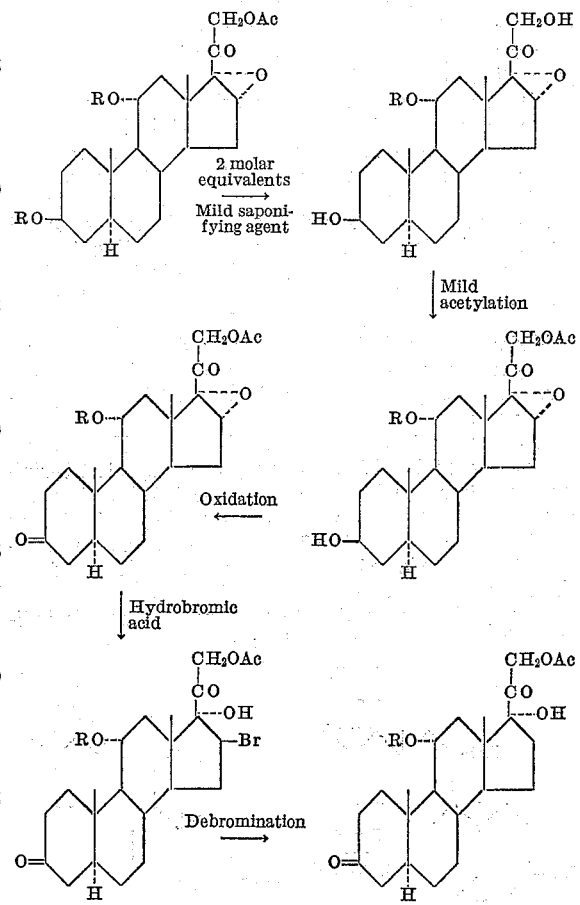

In the above equation R and Ac represent the same groups as heretofore set forth.

Referring to the above equation, the triester of 16α,17α- oxido-allopregnan-3β,11α,21-triol-20-one is dissolved in a suitable solvent, as for example, alcohol and refluxed for a short time with a mild saponifying agent, as for example, an alkali metal bicarbonate. Preferably, approximately 2 molar equivalents of the alkali metal bicarbonate is used and the resultant compound, as indicated in the equation, is in the corresponding 11-monoester, as for example, the monoacetate. The monoester is then dissolved in a suitable solvent, such as pyridine, and cooled to approximately −10° C., thereafter approximately 1 molar equivalent of an acetylating agent, such as acetic anhydride, is added and the mixture is kept in a refrigerator for approximately two days. Upon purification, the corresponding 11,21-diester, as for example, the diacetate, is produced.

The 11,21-diacetate of 16α,17α-oxido-allopregnan-3β,11α,21-triol-20-one is then treated with an oxidizing agent, as for example, chromic acid, N-bromoacetamide or an aluminum alkoxide in the presence of a hydrogen acceptor. The hydrogen acceptor is, preferably, a ketone, as for example, cyclohexanone or acetone and suitable aluminum alkoxides are aluminum isopropylate, t-butylate or phenoxide. Preferably, an inert solvent, such as benzene or toluene, is also utilized. Where the oxidizing agent is N-bromoacetamide, preferably, the oxidation takes place in solution in pyridine or other tertiary amine or in the presence of a tertiary lower aliphatic alcohol such as tertiary butanol.

The resultant 3-keto compound is suitably purified and then treated with hydrobromic acid to give the corresponding bromohydrin. Debromination of this bromohydrin with a debrominating agent such as Raney nickel or hydrogen in the presence of a palladium on calcium carbonate catalyst then gave the desired 11,21-diester as the diacetate of allopregnan-11α,17α,21-triol-3,20-dione. Conventional saponification of the diester produced the free triol which could be mildly acetylated to give the corresponding 21-monoacetate. Similar esterification gave other corresponding 21-esters.

Although in the above equation, the oxidation of 11,21-diester of the 16α,17α-oxido compound is indicated as the first step followed by the treatment with hydrobromic acid and debromination to add the 17α-hydroxy, it is within the scope of the present invention to first treat the 16,17-oxido compound with hydrobromic acid followed by debromination to produce the corresponding 17α-hydroxy compound and then treat this tetrol with an oxidizing agent to produce the final product indicated in the above equation. In this instance, however, the preferred oxidizing agent is N-bromoacetamide since other oxidizing agents may cause a rearrangement in Ring D of the molecule of a compound containing the 17α-hydroxy-20-keto group.

In other words, in the last mentioned modified process the diester of 16α,17α-oxido-allopregnan-3β,11α,21-triol-20-one is treated with hydrobromic acid followed by debromination to produce the corresponding 11,21-diester of allopregnan-3β,11α,17α,21-tetrol-20-one and this compound when oxidized with N-bromoacetamide produces the corresponding 3-keto compound.

A very similar reaction to that just outlined, is indicated in the following equation:

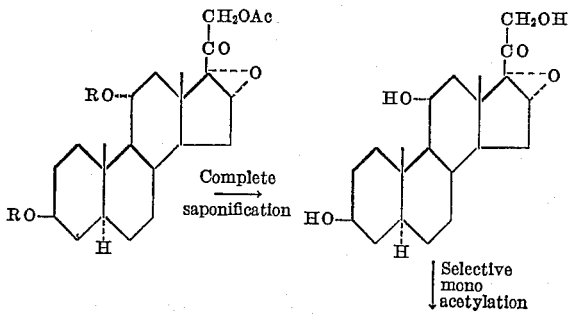

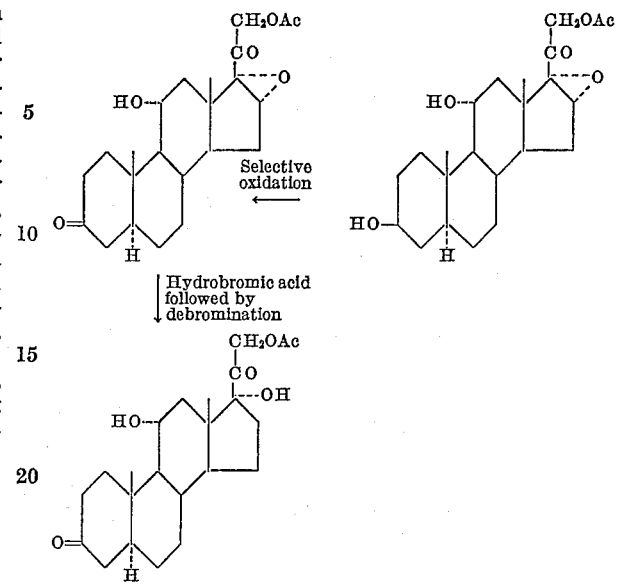

In the above equation, R and Ac represent the same groups as heretofore set forth.

It will be noted that in the above equation the triester of 16α,17α-oxido-allopregnan-3β,11α,21-triol-20-one is initially completely saponified to give the corresponding free triol. For this purpose a saponifying agent such as alkali metal hyroxide in alcohol is utilized. The free triol is then subjected to selective mono acetylation as hereinbefore set forth or treated with other esterifying agents in order to prepare the corresponding 21-monoester thereof. The 21-monoester is then treated with an oxidizing agent to selectively oxidize only the 3-hydroxy group. For this purpose, an oxidizing agent such as N-bromoacetamide under the conditions hereinbefore set forth or an aluminum alkoxide in the presence of a ketone hydrogen acceptor is utilized. The resultant 3-keto compound is then treated with hydrobromic acid followed by debromination to prepare the corresponding 21-monoester of allopregnan-11α,17α,21-triol-3,20-dione. In this reaction, the last two steps indicated in the equation can be reversed in order but, in this case also, only N-bromoacetamide can be utilized as the selective oxidation agent.

The following equation illustrates the production of a triester of allopregnan-3β,11α,17α,21-tetrol-20-one.

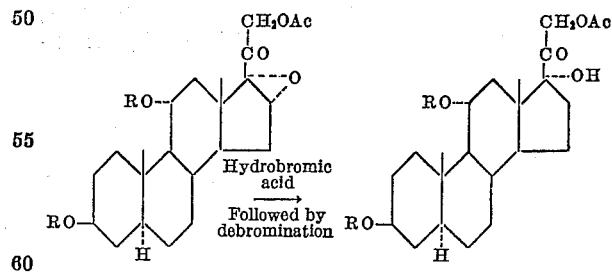

In the above equation, R and Ac represent the same groups as heretofore. Although in the above equation the 21-ester group is indicated as an acetate it may be understood that if the initial acylation in position 21 is performed with some other esterifying agent, any suitable triester may be prepared by this method.

In the above equations, and in the subsequent examples the present process and novel compounds produced thereby is illustrated by means of compounds taken from the allopregnane series having a 3β-hydroxy group. It may be understood, however, that the present reactions may be applied to compounds having the C–5 normal configuration and/or a 3α-hydroxy group.

The following specific examples serve to illustrate, but are not intended to limit the present invention:

Example I

A solution of 2 g. of 16α,17α-oxido-allopregnan-3β,11α-diol-20-one diacetate in 35 cc. of glacial acetic acid was treated at a temperature of 18° with 3 cc. of a 32% solution of hydrobromic acid in acetic acid. After waiting for five minutes, a solution of 1 molar equivalent of bromine in 15 cc. of glacial acetic acid (or in carbon tetrachloride) was added dropwise. When the solution had decolorized completely it was poured into water and the precipitate was collected, washed with water and air dried. The compound was dissolved in acetone and after adding an excess of sodium iodide the mixture was refluxed for 15 minutes. The sodium bromide formed during the reaction was filtered and the solution was treated with 12.5 g. of potassium bicarbonate and 7.3 cc. of acetic acid and the mixture was refluxed during 5 hours. It was poured into water and the product was extracted with chloroform, washed with water, dried over sodium sulphate and evaporated to dryness. Crystallization of the residue from methanol afforded 16α,17α-oxido-allopregnan-3β,11α,21-triol-20-one triacetate.

Example II

The triacetate obtained according to the previous example was refluxed for 1 hour with 1% ethanolic sodium (or potassium) hydroxide under an atmosphere of nitrogen. The mixture was diluted with water, extracted with chloroform, washed, dried and evaporated to dryness. Recrystallization of the residue gave 16α,17α-oxido-allopregnan-3β,11α,21-triol-20-one.

Example III 4.8 g. of 16α,17α-oxido-allopregnan-3β,11α,21-triol-20-one obtained according to Example II were dissolved in 20 cc. of pyridine and the solution cooled to −10° C. 1.5 cc. of acetic anhydride were added and the solution was kept in the refrigerator 2 days. It was then poured into water and extracted with chloroform. The chloroform solution was well washed with dilute hydrochloric acid and then with sodium bicarbonate and water, dried over sodium sulphate and evaporated to dryness. Crystallization from methanol afforded 16α,17α-oxido-allopregnan-3β,11α,21-triol-20-one 21-monoacetate.

Example IV

A solution of 3 g. of 16α,17α-oxido-allopregnan-3β,11α,21-triol-20-one 21-monoacetate in 80 cc. of benzene was concentrated to a volume of 70 cc., and after adding 15 cc. of cyclohexanone and a solution of 1 g. of aluminum isopropylate in 25 cc. of benzene was refluxed for 40 minutes. The mixture was then diluted with ether and hydrochloric acid. The organic layer was washed with dilute hydrochloric acid, sodium carbonate and water. After evaporation of the ether, the solution was subjected to steam distillation for 3 hours. The residue was then extracted with ether and the ether solution was washed, dried over sodium sulphate and evaporated to dryness. The residue was then crystallized from acetone-hexane. The 16α,17α-oxido-allopregnan-11α,21-diol-3,20-dione 21-monoacetate thus obtained was dissolved in acetic acid and treated with 4 cc. of a solution of hydrobromic acid in acetic acid. The solution was kept 30 minutes at a temperature of 20° C., and then poured into water. The precipitate of the bromohydrin was filtered, washed and dissolved in acetone. 30 g. of Raney nickel were added and the solution was refluxed for 5 hours. The catalyst was filtered and the solution was evaporated to dryness. The residue crystallized from ethyl acetate to give allopregnan-11α,17α,21-triol-3,20-dione 21-monoacetate.

Example V

A solution of 1.5 g. of 16α,17α-oxido-allopregnan-3β,11α,21-triol-20-one triacetate in 60 cc. of acetic acid was treated with 2.3 cc. of a 32% solution of hydrobromic acid in acetic acid. After 30 minutes standing at 20° C. the mixture was poured into water and the filtered bromohydrin was refluxed during 5 hours with 20 g. of Raney nickel in acetone solution. The catalyst was filtered and the solution was evaporated to dryness. Recrystallization from ethyl acetate yielded allopregnan-3β,11α,17α,21-tetrol-20-one 3,11,21-triacetate.

Alternatively, the debromination can be carried out by hydrogenation of the crude bromohydrin in alcoholic solution with three times its weight of 2% palladium on calcium carbonate catalyst prepared according to the method of Busch and Stowe, Ber., 49, 1063 (1916).

Example VI

An alcoholic solution of 16α,17α-oxido-allopregnan-3β,11α,21-triol-20-one triacetate was refluxed for 25 minutes with 2.1 molar equivalents of sodium bicarbonate and then poured into water. The precipitate was collected and washed to neutral to give the crude 11-monoacetate which under mild acetylation at low temperature as described in Example III gave 16α,17α-oxido-allopregnan-3β,11α,21-triol-20-one 11,21-diacetate. Treatment with hydrobromic acid followed by debromination with Raney nickel or by hydrogenation in the presence of palladium on calcium carbonate (according to Example V) yielded allopregnan-3β,11α,17α,21-tetrol-20-one 11,21-diacetate.

Example VII

A solution of 1 g. of the diacetate obtained according to Example VI in pyridine was treated with 1.4 mols of N-bromoacetamide and the mixture was kept during 20 hours at room temperature and then poured into water. The product was extracted with chloroform, washed with dilute hydrochloric acid, sodium carbonate and water, dried over sodium sulphate and evaporated to dryness. Recrystallization from ethyl acetate gave allopregnan-11α,17α,21-triol-3,20-dione 11,21-diacetate, having a melting point of 196°–199° C., [α]$_D$ +48° (chloroform).

This compound was saponified by refluxing with 2% alcoholic sodium (or potassium) hydroxide during 1 hour under an atmosphere of nitrogen. After pouring into water the product was filtered and washed to give allopregnan-11α,17α,21-triol-3,20-dione which by selective acetylation by the method described in Example III gave allopregnan-11α,17α,21-triol-3,20-dione 21-monoacetate

Example VIII

A solution of 1 g. of 16α,17α-oxido-allopregnan-3β,11α,21-triol-20-one 11,21-diacetate prepared according to the method described in Example VI, in 25 cc. of acetic acid was treated with a solution of 200 mg. of chromic acid in 3 cc. of 80% acetic acid, maintaining the solution at 15° C., during the addition. After standing at room temperature for 2 hours the mixture was poured into water and the precipitate was filtered, washed and air dried. Recrystallization from hexane-acetone yielded 16α,17α-oxido-allopregnan-11α,21-diol-3,20-dione diacetate.

The same reaction can be carried out by oxidation of the diacetate with N-bromoacetamide in pyridine solution, keeping the mixture during 20 hours at room temperature.

Example IX

A solution of 16α,17α-oxido-allopregnan-3β,11α,21-triol-20-one diacetate in 40 cc. of anhydrous toluene and 15 cc. of cyclohexanone was slowly distilled during 40 minutes and in the course of this time a solution of 1 g. of aluminum isopropylate in 20 cc. of toluene was added dropwise. After this time the residual volume of the solution was approximately 60 cc. The mixture was cooled and a saturated solution of sodium potassium tartrate was added and the organic layer was washed with water and subjected to steam distillation until complete removal of the volatile components. The aqueous residue was extracted with ethyl acetate, washed, dried over sodium sulphate and evaporated to dryness. Recrystallization from acetone-hexane gave 16α,17α-oxido-allopregnan-11α,21- diol-3,20-dione diacetate identical to the one obtained according to the previous example.

*Example X*

A solution of 2 g. of 16α,17α-oxido-allopregnan-11α,21-diol-3,20-dione diacetate in 80 cc. of glacial acetic acid was treated with 3.5 cc. hydrobromic acid in acetic acid and the mixture was kept standing during 30 minutes at a temperature of 20° C. It was then poured into water and the precipitate was filtered, washed and air dried. The crude bromohydrin was dissolved in acetone and refluxed for 5 hours with 30 g. of Raney nickel. After working up as described in Example V, allopregnan-11α,17α,21-triol-3,20-dione 11,21-diacetate was obtained.

Instead of using Raney nickel, the debromination can be carried out by hydrogenation in the presence of palladium on calcium carbonate catalyst with the same result.

We claim:

1. A new compound selected from the class consisting of a 16α,17α-oxido-pregnan-3β,11α,21-triol-20-one, 11-mono lower fatty acid esters thereof, 11,21-di lower fatty acid esters thereof, the 11-mono benzoate thereof and the 11,21-di benzoate thereof.
2. The compounds of claim 1, wherein the C–5 configuration is allo.
3. 16α,17α - oxido - allopregnan - 3β11α,21 - triol - 20-one 11-monoacetate.
4. 16α,17α - oxido - allopregnan - 3β,11α,21 - triol - 20-one 21-monoacetate.
5. 16α,17α - oxido - allopregnan - 3β,11α,21 - triol - 20-one 11,21-diacetate.
6. 16α,17α - oxido - allopregnan - 3β,11α,21 - triol - 20-one triacetate.
7. A new compound selected from the class consisting of a 16α,17α - oxido - pregnan - 11α,21 - diol - 3,20 - dione, 21-mono lower fatty acid esters thereof, 11,21-di lower fatty acid esters thereof, the 21-mono benzoate thereof and the 11,21-di benzoate thereof.
8. The compound of claim 7, wherein the C–5 configuration is allo.
9. 16α,17α - oxido - allopregnan - 11α,21 - diol - 3,20-dione 21-monoacetate.
10. 16α,17α - oxido - allopregnan - 11α,21 - diol - 3,20-dione diacetate.
11. A new compound selected from the group consisting of a pregnan-3β,11α,17α,21-tetrol-20-one, 11,21-di lower fatty acid esters thereof, 3,11,21-tri lower fatty acid esters thereof, the 11,21-di benzoate thereof and the 3,11,21-tri benzoate thereof.
12. The compound of claim 11, wherein the configuration at C–5 is allo.
13. Allopregnan - 3β,11α,17α,21 - tetrol - 20 - one 11,21-diacetate.
14. Allopregnan - 3β,11α,17α,21 - tetrol - 20 - one 3,11,21-triacetate.

References Cited in the file of this patent
UNITED STATES PATENTS 2,659,744     Schneider _____ Nov. 17, 1953